United States Patent
Shankar et al.

(10) Patent No.: US 7,257,611 B1
(45) Date of Patent: Aug. 14, 2007

(54) DISTRIBUTED NONSTOP ARCHITECTURE FOR AN EVENT PROCESSING SYSTEM

(75) Inventors: Ravi Shankar, San Jose, CA (US); David S. Labuda, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/562,785

(22) Filed: May 2, 2000

Related U.S. Application Data

(60) Provisional application No. 60/197,107, filed on Apr. 12, 2000.

(51) Int. Cl.
G06F 15/16 (2006.01)

(52) U.S. Cl. .................. 709/201; 709/209; 709/211; 709/217; 709/229; 709/234; 455/2.01; 455/3.02; 455/405; 705/30; 705/32; 713/323

(58) Field of Classification Search .............. 705/30, 705/32; 709/208, 201, 209, 225, 229, 212, 709/318, 205, 211, 217, 234, 203, 218, 219, 709/202, 223, 224; 455/2.01, 3.02, 405; 713/323
See application file for complete search history.

(56) References Cited

U.S. PATENT DOCUMENTS

| | | | | |
|---|---|---|---|---|
| 4,430,530 A | * | 2/1984 | Kandell et al. | 379/29.01 |
| 5,036,389 A | * | 7/1991 | Morales | 725/24 |
| 5,220,501 A | | 6/1993 | Lawlor et al. | 364/408 |
| 5,313,664 A | * | 5/1994 | Sugiyama et al. | 705/21 |
| 5,448,623 A | * | 9/1995 | Wiedeman et al. | 455/430 |
| 5,475,585 A | | 12/1995 | Bush | 364/401 |
| 5,555,444 A | * | 9/1996 | Diekelman et al. | 455/12.1 |
| 5,590,395 A | * | 12/1996 | Diekelman | 455/13.1 |
| 5,615,249 A | * | 3/1997 | Solondz | 455/450 |
| 5,666,648 A | * | 9/1997 | Stuart | 370/321 |
| 5,732,400 A | | 3/1998 | Mandler et al. | 705/26 |
| 5,799,087 A | | 8/1998 | Rosen | 380/24 |
| 5,845,206 A | * | 12/1998 | Castiel et al. | 455/13.4 |
| 5,870,724 A | | 2/1999 | Lawlor et al. | 705/42 |
| 5,883,584 A | * | 3/1999 | Langemann et al. | 340/870.01 |
| 5,898,762 A | | 4/1999 | Katz | 379/93.12 |
| 5,913,164 A | * | 6/1999 | Pawa et al. | 455/427 |
| 5,920,629 A | | 7/1999 | Rosen | 380/24 |

(Continued)

OTHER PUBLICATIONS

Black, Jim; "Real-Time Fraud Management"; Jul./Aug. 1999, Billing World.

*Primary Examiner*—Michael Y. Won
(74) *Attorney, Agent, or Firm*—Townsend and Townsend and Crew LLP

(57) ABSTRACT

Methods and architectures for implementing a fault tolerant real time event processing system are provided. The system includes at least one satellite and at least one primary data center. The system remains operational when the primary data center is unavailable to the satellite. The system includes business logic that is divided into logic that can be run effectively at a satellite, and logic that can be run at the main data center to result in effective decisions. When the network connection is impaired or the main data center is unavailable, the satellite can process an incoming event locally. The system includes procedures so that events processed at a satellite during a period of noncommunication with the primary data center will be entered into the primary data center records at a later point.

42 Claims, 12 Drawing Sheets

U.S. PATENT DOCUMENTS

| | | | | |
|---|---|---|---|---|
| 5,963,648 | A | | 10/1999 | Rosen .......................... 380/24 |
| 5,987,233 | A | * | 11/1999 | Humphrey .................. 709/217 |
| 6,047,067 | A | | 4/2000 | Rosen .......................... 380/24 |
| 6,058,375 | A | | 5/2000 | Park ............................. 705/30 |
| 6,070,051 | A | * | 5/2000 | Astrom et al. .............. 455/12.1 |
| 6,112,304 | A | * | 8/2000 | Clawson ..................... 713/156 |
| 6,141,759 | A | * | 10/2000 | Braddy ........................ 726/14 |
| 6,154,765 | A | | 11/2000 | Hart ............................ 709/201 |
| 6,170,014 | B1 | * | 1/2001 | Darago et al. .............. 709/229 |
| 6,243,760 | B1 | * | 6/2001 | Armbruster et al. ........ 709/243 |
| 6,381,228 | B1 | * | 4/2002 | Prieto et al. ................. 370/323 |
| 6,400,925 | B1 | * | 6/2002 | Tirabassi et al. ........... 455/12.1 |
| 6,415,323 | B1 | * | 7/2002 | McCanne et al. ........... 709/225 |
| 6,427,172 | B1 | * | 7/2002 | Thacker et al. ............. 709/235 |
| 6,429,812 | B1 | * | 8/2002 | Hoffberg .................. 342/357.1 |
| 6,442,652 | B1 | * | 8/2002 | Laboy et al. ................ 711/138 |
| 6,553,336 | B1 | * | 4/2003 | Johnson et al. ............. 702/188 |
| 6,563,800 | B1 | * | 5/2003 | Salo et al. ................... 370/264 |
| 6,658,463 | B1 | * | 12/2003 | Dillon et al. ................ 709/219 |
| 6,735,631 | B1 | * | 5/2004 | Oehrke et al. .............. 709/226 |
| 6,907,429 | B2 | * | 6/2005 | Carneal et al. ................ 707/10 |
| 6,947,440 | B2 | * | 9/2005 | Chatterjee et al. .......... 370/429 |

* cited by examiner

Receiving an Event

Processing an Event at the Primary Data Center

DISTRIBUTED NONSTOP ARCHITECTURE FOR AN EVENT PROCESSING SYSTEM

This application claims the benefit of U.S. Provisional Application No. 60/197,107 filed Apr. 12, 2000, titled "Distributed Nonstop Architecture for An Event Processing System", inventor Ravi Shankar.

The present invention relates to event processing systems and electronic business. More specifically, the invention relates to storing data at a satellite that processes an event if the primary data center is unavailable.

It is known to use event processing systems that periodically process data. For instance, there are systems that implement month-end billing. Such systems can include distributed data centers and a central processing facility. Data is periodically aggregated at the central processing facility. At the end of a month, the central processing facility can process the data completely, e.g. calculate total account usage, apply a rating scheme, and determine the amount of the bill. However, such month-end billing systems allow relatively primitive user management and credit management.

A real-time system allows flexibility and makes possible powerful user management and credit management techniques. A system typically includes distributed data centers ("satellites") and a central processing facility ("primary data center"). With a real-time system, events are processed when they are received, and a very large database is available to allow greater sophistication in quick decisions about user management, credit management, and other business or design decisions. However, the nature of real-time systems leaves them vulnerable to problems relating to the quality of the network connections, including latency problems and reliability problems. In additional, where there is a central processing facility, critical failure can occur when the central processing facility experiences reduced availability, due to for instance system slowdown, failure, or maintenance operations. It is known to address such problems by having a mirrored site; however, maintaining such a site is expensive.

Real time systems are desirable because, among other things, losses can be reduced and resources directed to authorized customers. However, a major objection to such systems is that a critical failure for a satellite occurs when the central processing facility is unavailable. Although such failure is uncommon, when one occurs, it has extremely detrimental effects on, among other things, user satisfaction and profits.

Accordingly, it would be advantageous to have a real time event processing system that is fault tolerant.

SUMMARY OF THE INVENTION

The invention provides methods and architectures for implementing a fault tolerant real time event processing system. In one embodiment, the system includes at least one satellite and at least one primary data center. The system remains operational when the primary data center is unavailable to the satellite. The system includes business logic that is divided into logic that can be run effectively at a satellite, and logic that can be run at the main data center. When the network connection is impaired or the main data center is unavailable, the satellite can process an incoming event locally. The system includes procedures so that events processed at a satellite during a period of noncommunication with the primary data center will be entered into the primary data center records at a later point. The system is highly configurable.

The effect of planned disruptions of service, such as maintenance, can be minimized. The system robustness discourages fraud because the user often cannot distinguish times when the system is fully operational from times when the system in operating with a limited capacity for fraud detection. Several embodiments are described below.

In one embodiment, the invention provides a method for processing an event. An event is received at a satellite. It is determined whether a primary data center is available for processing. If the primary data center is available, the event is processed at the primary data center when the event is received at the primary data center. If the primary data center is unavailable, the event is processed at the satellite.

In another embodiment, the invention provides a method for operating an accounting system wherein current statistics of the account including summary information are continuously available during normal operation. The system includes a satellite and a primary data center. A main database is maintained at the primary data center. Selected pushed data that includes a portion of the information in the main database, is maintained at the satellite. A satellite business logic is established that is to be run on the satellite using selected pushed data when the satellite is in connect mode. A primary data center business logic is established to be run on the primary data center when the satellite is in connect mode. A disconnect business logic is established to be run on the satellite when the satellite is in disconnect mode. When an event is received at the satellite, it is determined whether to process the event in connect mode or disconnect mode. If the event is to be processed in connect mode, the satellite business logic is run on the satellite and the primary data center business logic is run on the primary data center. If the event is to be processed in disconnect mode, the disconnect business logic is run on the satellite using selected pushed data.

In another embodiment, a system for fault tolerant processing of events is provided. The events are generated by a plurality of users having an account on the system. The system includes a satellite, primary data center, and communication link that couples the satellite and primary data center. The satellite includes a connection manager that includes satellite business logic and disconnect business logic. The satellite is configured to process events when the satellite is in a disconnect mode. The primary data center includes a second connection manager that includes primary data center business logic. The primary data center includes up-to-date information for each account.

Other features and advantages of the invention will become readily apparent upon review of the following description in association with the accompanying drawings, where the same or similar structures are designated with the same reference numerals.

DETAILED DESCRIPTION OF PREFERRED EMBODIMENTS

Embodiments of the invention are described below with reference to specific real-time processing systems and methods. However, embodiments of the invention can be implemented in various ways. For example, aspects of the invention can be implemented in software or hardware or using special purpose processors or by any other known mechanism. Therefore, the description of the embodiments that follows is for purposes of illustration and not limitation.

Figure 1:
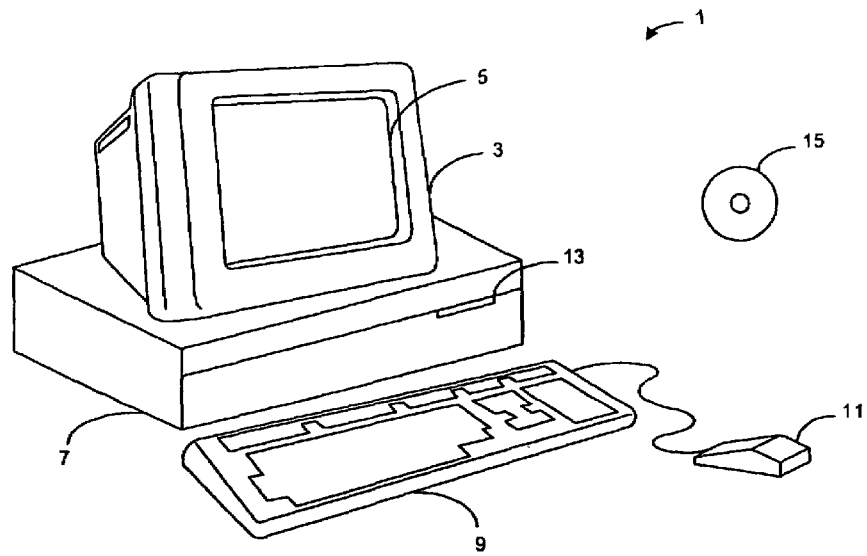
FIG. 1 illustrates an example of a computer system that can be utilized to execute the software of an embodiment of the invention.

FIG. 1 illustrates an example of a computer system that can be used to execute software implementing a portion of a method of an embodiment of the invention, and can act as a client, satellite, event generator/network protocol server, or primary data center. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
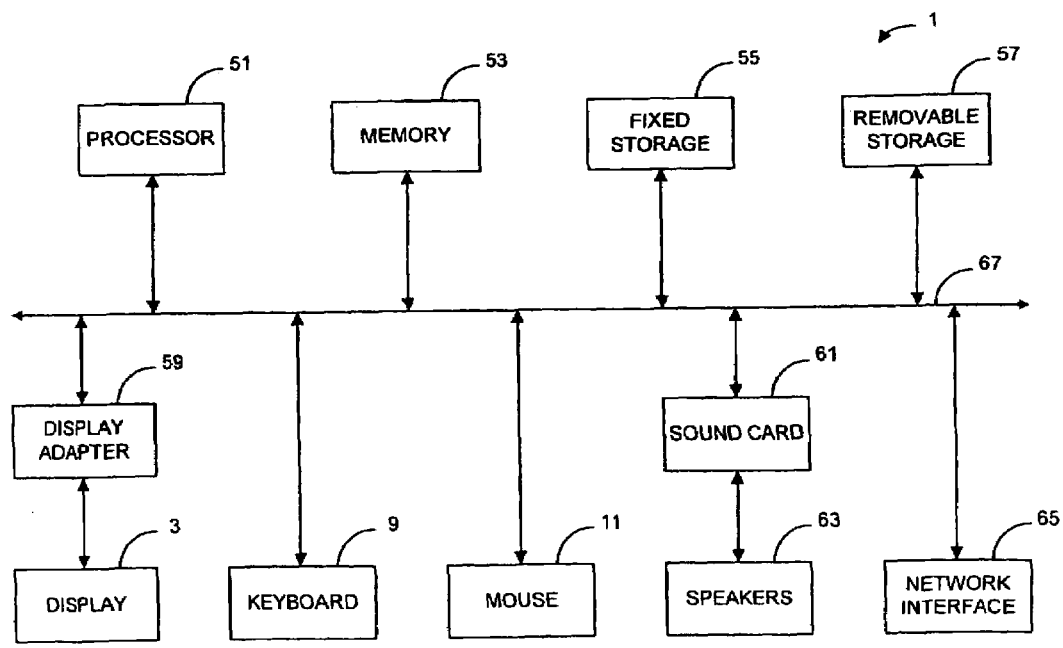
FIG. 2 illustrates a system block diagram of the computer system of FIG. 1.

FIG. 2 shows a system block diagram of computer system 1 that can be used to execute software implementing a portion of a method of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
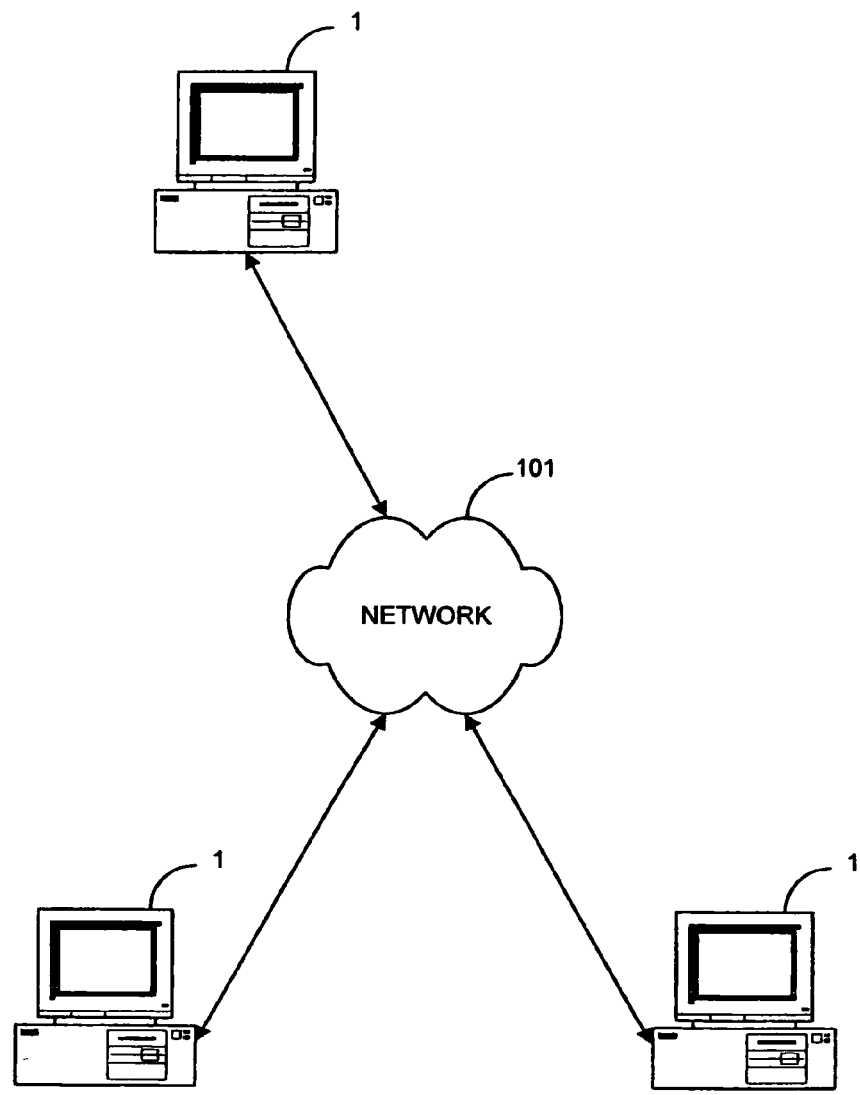
FIG. 3 illustrates a network of multiple computer systems such as the Internet.

FIG. 3 shows a schematic drawing of a network of multiple computer systems. A network 101 provides communication between multiple computer systems 1. In an embodiment of the invention, such multiple computer systems 1 can act as a computer executing a client, event generator/network protocol server, satellite, or main data center.

Figure 4:
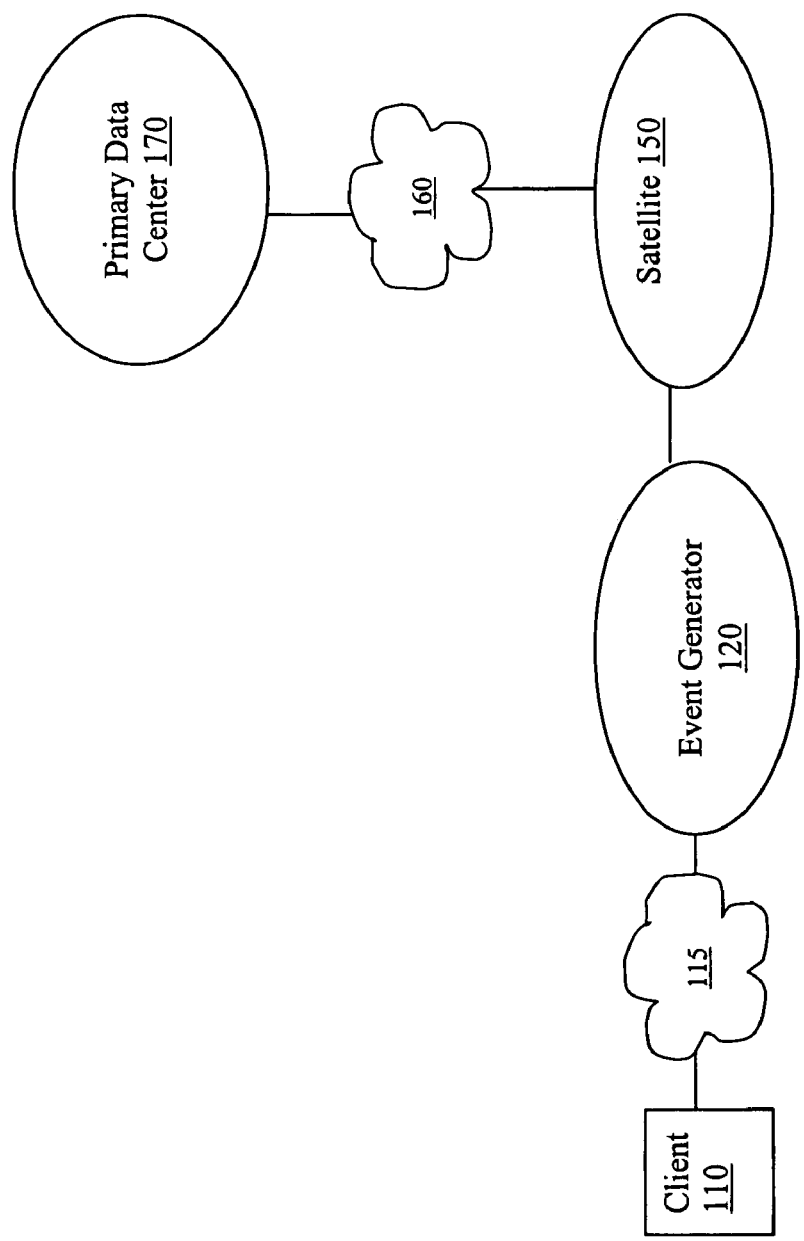
FIG. 4 illustrates an example of an embodiment of a real-time event processing system of the invention.

FIG. 4 illustrates a schematic diagram of an real time event processing system that can implement the fault tolerant system of the invention. The system includes a client 110, which can be used by a user to access the system. The client can execute on, among other things, a computer (such as shown in FIGS. 1 and 2), handheld computing device, cell phone with networking capability, or a set top box. The user can be a human who wants to engage in gaming, make a phone call, view content such as articles or stock quotes, access a service such as connectivity to the Internet, or do on-line shopping.

The machine on which the client 110 is executing is coupled to an event generator/network protocol server 120 through a communication link 115 such as, for instance, a modem and a network such as the Internet, phone lines, or wireless communications. Communication link 115 is shown as a network in FIG. 1. The event generator/network protocol server 120 is coupled to a satellite 150 by a direct connection in a preferred embodiment, though it can be coupled indirectly. The satellite 150 is coupled to a primary data center 170 through a communication link 160, which in a preferred embodiment is a network.

For illustration purposes, FIG. 4 shows one client 110, one event generator/network protocol server 120, one satellite 150, and one primary data center 170. In a preferred embodiment, the invention includes multiple clients, event generators, and satellites. In a preferred embodiment, each satellite is associated with one event generator that serves multiple clients. Each satellite can communicate with the primary data center. Alternate embodiments can include multiple mirrored primary data centers. However, the described method enabling continuous processing of events when in a communications failure mode and recovery of event history after the failure is recovered from, can be implemented on any real-time architecture.

Figure 5:
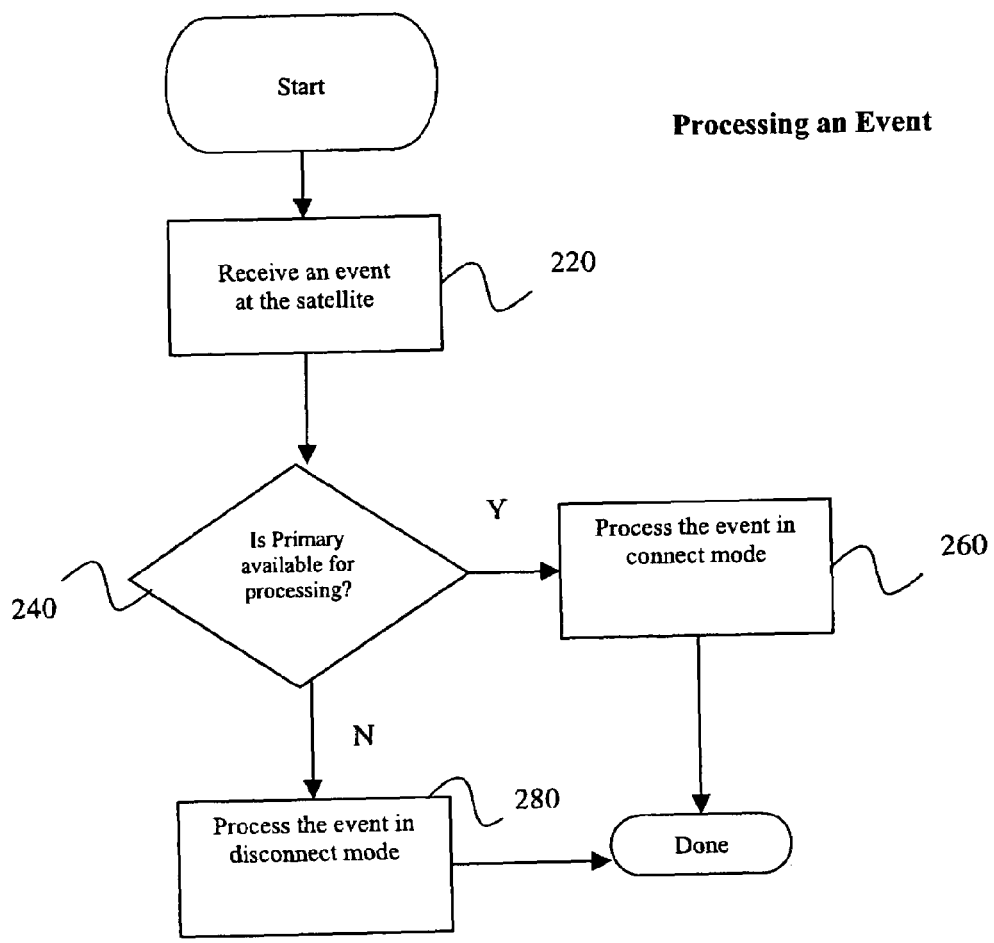
FIG. 5 is a process flow diagram of processing an event.

FIG. 5 is a process flow diagram showing a basic way in which the invention processes an event that has been generated by the event generator/network protocol server 120. An event is received at the satellite at a step 220. The satellite determines whether or not the primary data center is considered available for processing 240. If the primary data center is considered available for processing, the mode of operation is called the "connect" mode. The event is processed in connect mode 260, which includes processing at the primary data center. Otherwise the satellite processes the event in disconnect mode 280.

When the primary data center is available, business logic at the primary data center implements decision analysis using up-to-date and extensive data related to the user account, resulting in a high degree of control and accuracy in decision making. (In a preferred embodiment, even when the primary data center is available, there is business logic at the satellite that supplements the logic at the primary data center). The primary data center processes the result of the decision and updates its records.

When the primary data center is not available to the satellite, responses to arriving events are made using business logic at the satellite that uses a smaller amount of locally stored data that is not guaranteed to be current. In such a case, the satellite stores data regarding events it is processing. When the primary data center becomes available, the data is sent to the primary data center and the primary data center updates its database. In an alternate embodiment, the primary data center can review the decision and take any desired follow up action.

At the time of receiving an event, the satellite must determine whether to process the event in "connect mode" or "disconnect mode". Occasions for the satellite to operate in disconnect mode include when the communication link, e.g. network connection, is overly slow, or when the primary data center fails to respond. In a preferred embodiment, the satellite will check whether the main is responding to requests within a predetermined and configurable interval, such as 0.1 seconds, and will operate in disconnect mode if a response is not received.

These modes indicate what processing and what business logic will be used. In alternate embodiments there can be further modes, such as a maintenance mode. Where a shutdown has been planned, it can be possible to guarantee the "freshness" of data at the satellite by pushing data immediately before the shutdown, and therefore a modified business logic can be implemented instead of the "disconnect" business logic during a planned maintenance period.

Figure 6:
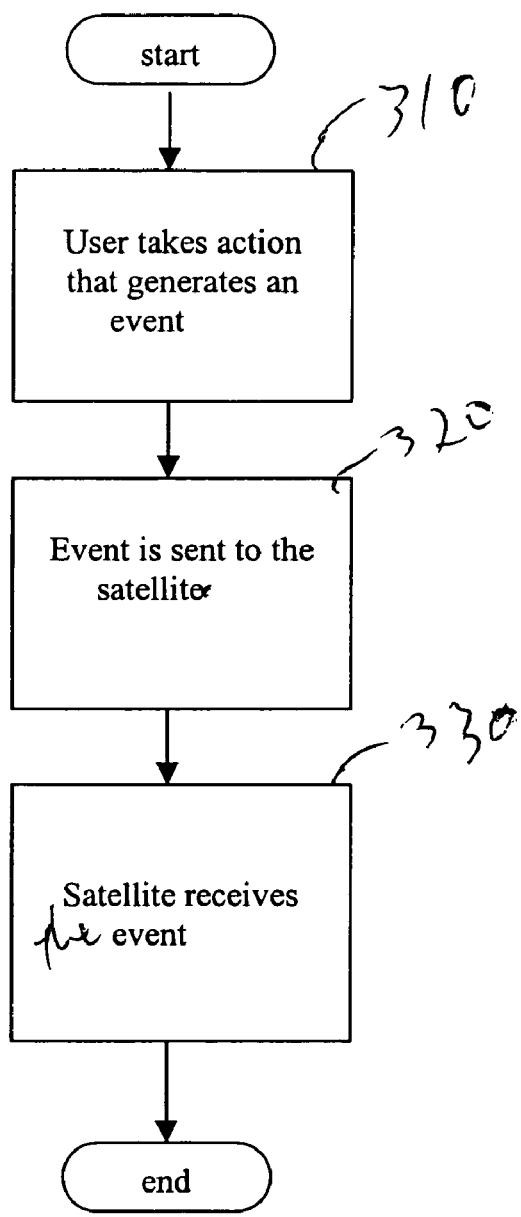
FIG. 6 is a process flow diagram of receiving an event at the satellite.

The satellite processes events. The implementation of event generation is not critical to the invention. However, a brief description of one way of generating events is provided here. Referring to FIG. 6, in a preferred embodiment, an action at a client generates a request 310. In a preferred embodiment, a human user can type commands, select buttons, or perform other actions that generate a request. The event generator/network protocol server generates the event and sends the event to the satellite 320. The satellite receives the event 330. One way the event generator/network protocol server can be implemented is as a Network Access Server (NAS) including a radius daemon that identifies and processes commands in the radius protocol. The NAS translates the user request into a message, e.g. an API (application programming interface) call, which is sent to the satellite.

There are many different types of events. Some events require a response from the satellite. For instance, events can be requests for authorization to logon or to gain access to restricted content. Other requests can be configured so that they do not necessarily require a response, for example a logoff request (though the logoff typically is processed and included in the main database as connect time, or can be included in the database as a transaction.) Other examples of events include a mouse click that results in access to content or selection of a certain game to play in an Internet gaming service.

When an event has been handled in a way that results in an error, the error can be ignored, or handled in various ways. For instance, if a user exceeds his credit limit, the error can be ignored or the account can be suspended. If there are simultaneous logins, follow up can include terminating the session of one of the logins or allowing both sessions to proceed. The implementer can configure the system as he chooses.

The primary data center maintains a detailed up-to-date database for every account in the system that includes large and detailed information, e.g. a record of every financial transaction that has occurred on the account, as well as detailed analysis information such as the current account balance including all transactions. A major advantage of a real-time system is that such statistics as current account balance are continuously available and not merely available at month-end billing time, as is typically the case for phone bills today. This database is called the primary database or main database.

A smaller subset of the main database is maintained at the satellite. In a preferred embodiment, the satellite database includes information for every account in the system. In an alternate embodiment the satellite database can include information only for open accounts. Data included on the satellite database can include slowly changing data such as account login name and small data such as account password. Small data will minimize the amount of bandwidth needed to send data from the primary data center to the satellite. Account data that changes slowly if at all also reduces the bandwidth needed, as longer periods can happen between updates. Other rationales for including data can exist, and for instance, an implementer can decide to include some rapidly changing or large data.

Figure 7:
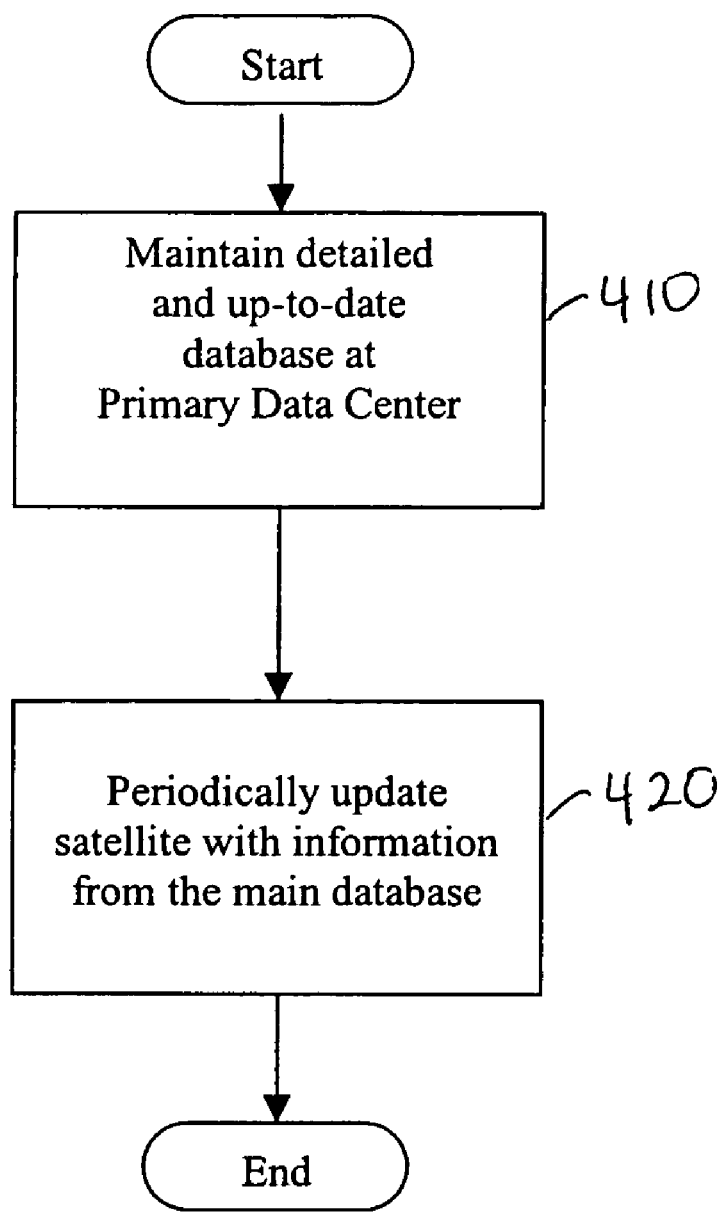
FIG. 7 is a process flow diagram of maintaining the satellite database.

A process flow diagram for maintaining the database is shown in FIG. 7. A detailed and up-to-date main database is maintained at the primary data center 410. The satellite database is periodically updated using information from the main database 420. This results in the satellite database including recent data, but not necessarily being completely up-to-date. Maintaining the satellite database can be accomplished by any known mechanism. For instance, replication of a database is known in the art. It can be accomplished by periodically pushing selected data to the satellite. The information on the satellite is much smaller than the information in the main database, although in a preferred embodiment it includes basic information on all accounts.

Referring to FIG. 5, at a step 220 an event is received at the satellite. After receiving an event at the satellite 220, in a preferred embodiment a decision is made of whether the satellite should operate in connect mode or disconnect mode 240. If the result of the decision step is positive, and the process proceeds along a "Yes" path to process the event in connect mode 260.

Figure 8:
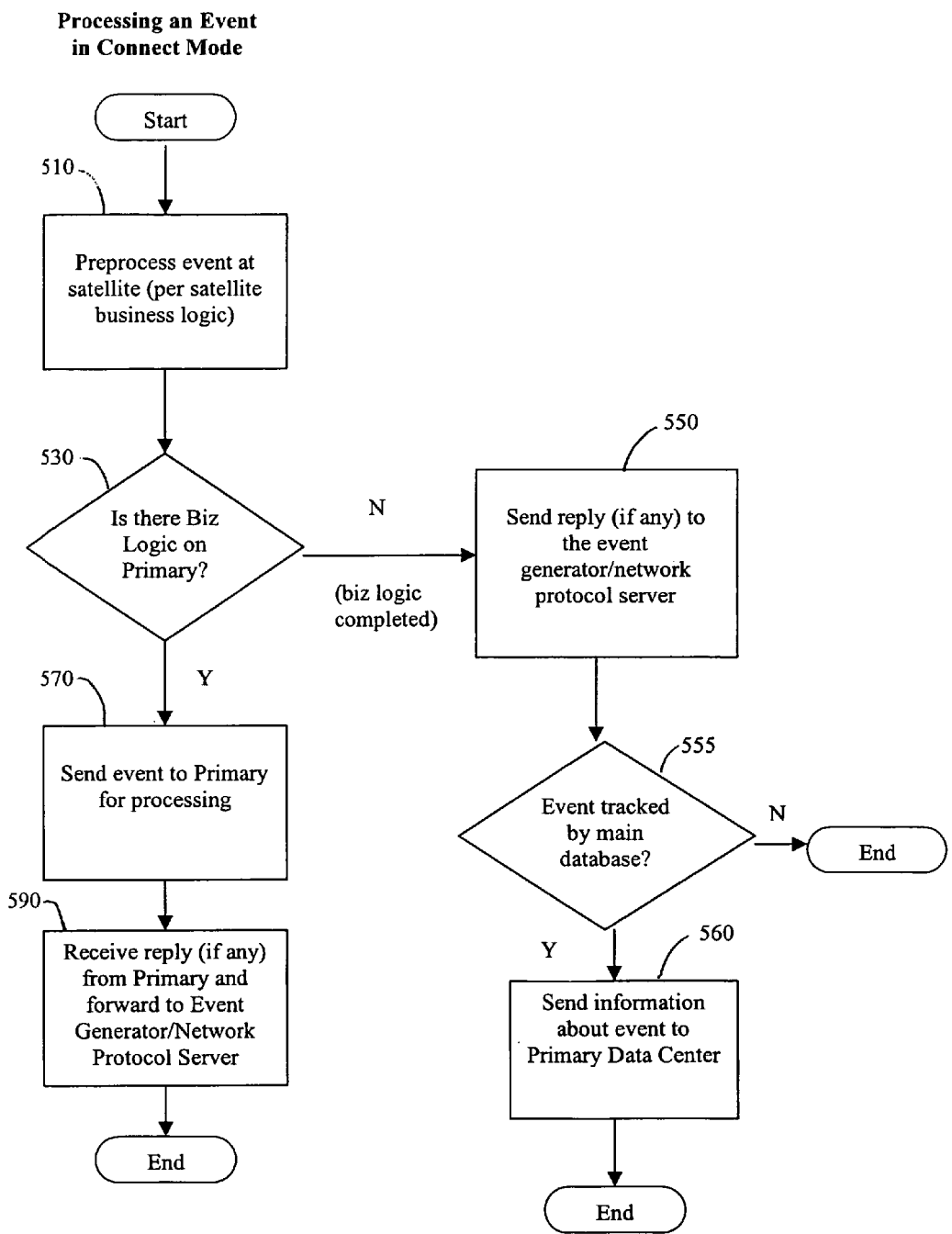
FIG. 8 is a process flow diagram of processing an event in connect mode.

Details of processing the event in connect mode are shown in FIG. 8. If the business logic for connect mode indicates, pre-processing of the event, if any, is done locally at the satellite using local data 510. Typically pre-processing will includes implementation of business logic using data available on the satellite. It is determined whether there remains decision making about the event to be done, i.e. whether there is business logic to be run at the primary data center 530. If there is no additional business logic (that is, a decision about handling the event has been made), then the process proceeds along a "No" path and the satellite sends a reply (if any) to the event generator/network protocol server, 550. (Some events, for example a logoff event, can be configured not to generate a reply.) If information relating to the event is used by the main database, information about the event is sent to the primary data center 555. Whether or not information about the event is sent to the primary data center is configurable. For instance, an event that has an effect on billing typically can be sent. The system can be configured so that information about a denial of login is not sent to the primary data center. However, it can be desirable to send to the primary data center repeated denial of access to high-value content, which can be indicative of hacker activity. The pre-processing and what information, if any, is sent to the main in case of denial is configurable.

Figure 9:
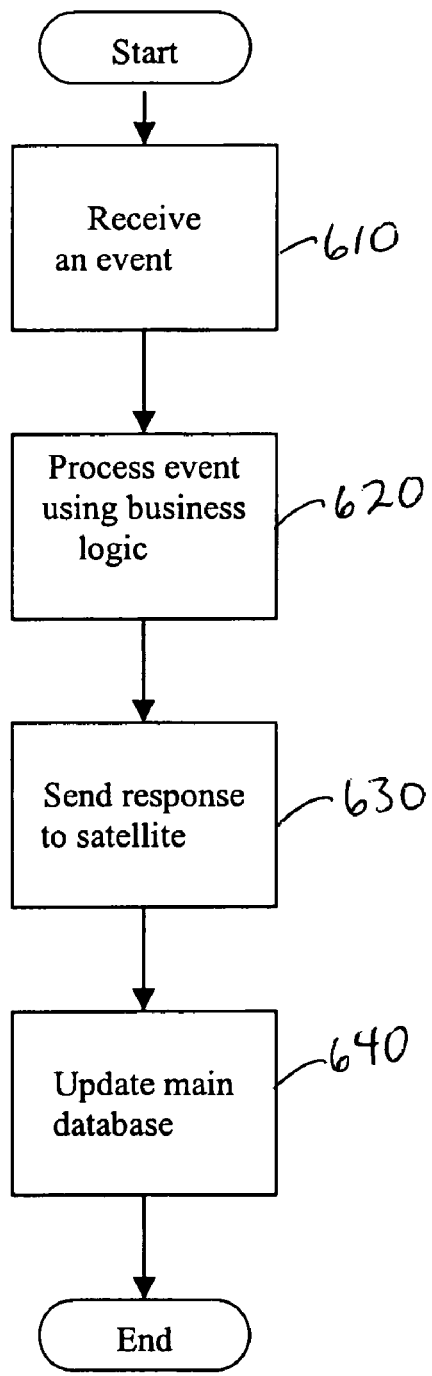
FIG. 9 is a process flow diagram of event processing at the primary data center.

If there is business logic to be run on the primary data center 530, the process proceeds along a "Yes" path and information about the event is sent to the primary data center for processing 570. A process flow diagram of event processing at the primary data center is shown in FIG. 9. The primary data center receives an event 610. Business logic at the primary data center is used to process the event, using the main database if needed 620. The primary data center sends a response to the satellite 630. The primary data center updates the main database 640.

Referring again to FIG. 8, the satellite will receive a reply (where the system is configured so that a reply is sent) from the primary data center 590. In a preferred embodiment, when there is a reply, the reply includes a direct instruction for the event generator/network protocol server and needs no handling by the satellite other than forwarding to the event generator/network protocol server 590. The event generator/network protocol server takes appropriate action with regard to the user (not shown). In an alternate embodiment, the process can include post-processing at the satellite after the primary data center has done partial processing. A reply can be, for example, authorization to access high value content. An event can generate no reply, for example, where it is a logoff request.

Figure 10:
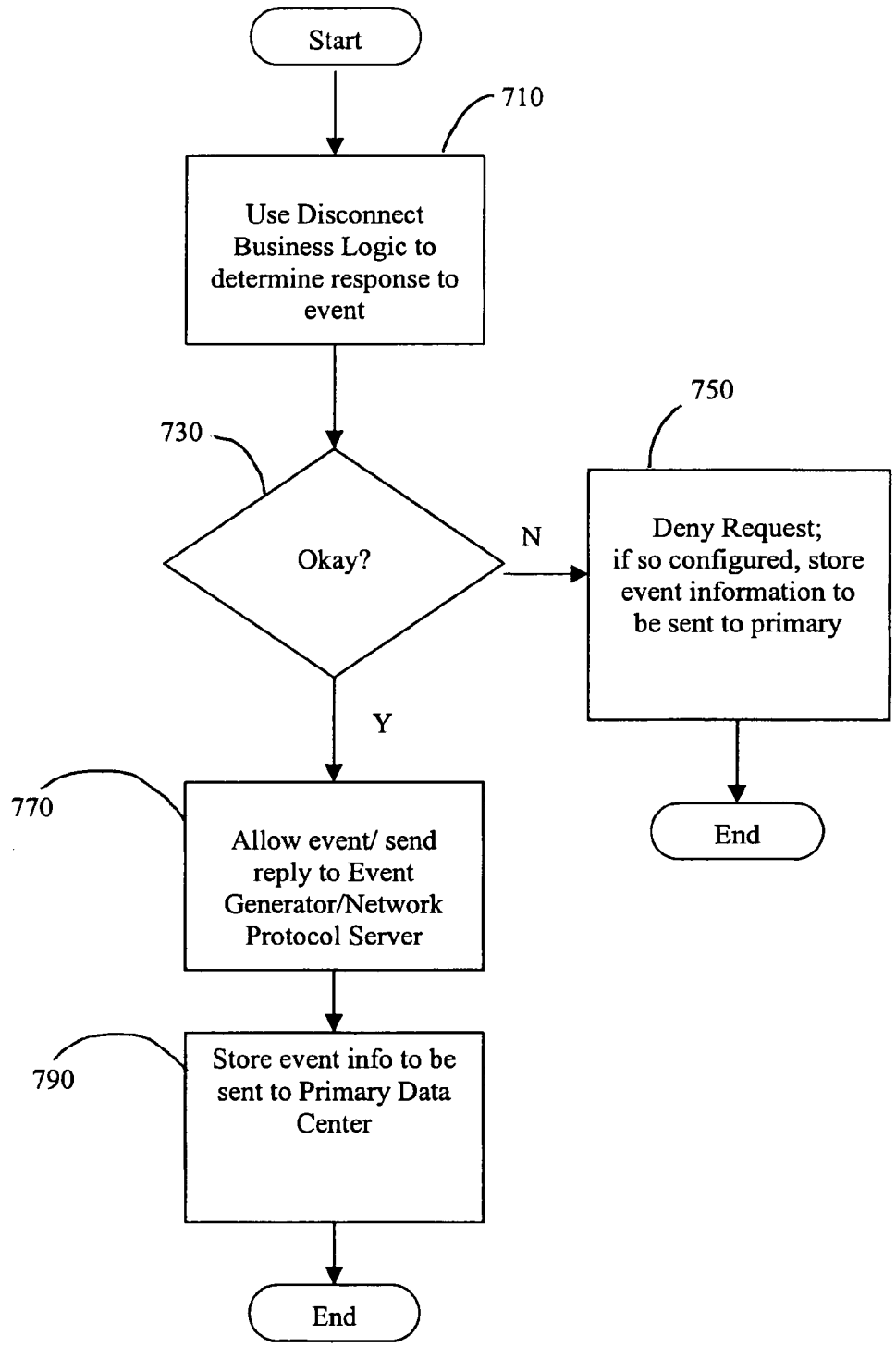
FIG. 10 is a process flow diagram of processing an event in disconnect mode.

Referring again to FIG. 5, if a result of whether the primary data center is available for processing 240 is negative, the process will proceed along a "No" path and the satellite will process the event in disconnect mode 280. Details of processing the event in disconnect mode are shown in FIG. 10. In a step marked by reference number 710 the satellite uses business logic, called "disconnect business logic" to determine what the response to the event should be. If the event should not be allowed to proceed according to the logic, the satellite denies the request 750. If the disconnect business logic is configured to do so, information about the event is stored at the satellite for communication to the primary data center when it becomes available 750. In a preferred embodiment, information about some kinds of events is stored, for instance login attempts, but not about other kinds, e.g. denial of specific access requests.

If it is determined that the event should proceed, the event is allowed and appropriate associated actions are taken and an appropriate reply sent to the event generator/network protocol server 770. Information about the event is stored at the satellite 790. This information is communicated to the primary data center when it becomes available.

Figure 11:
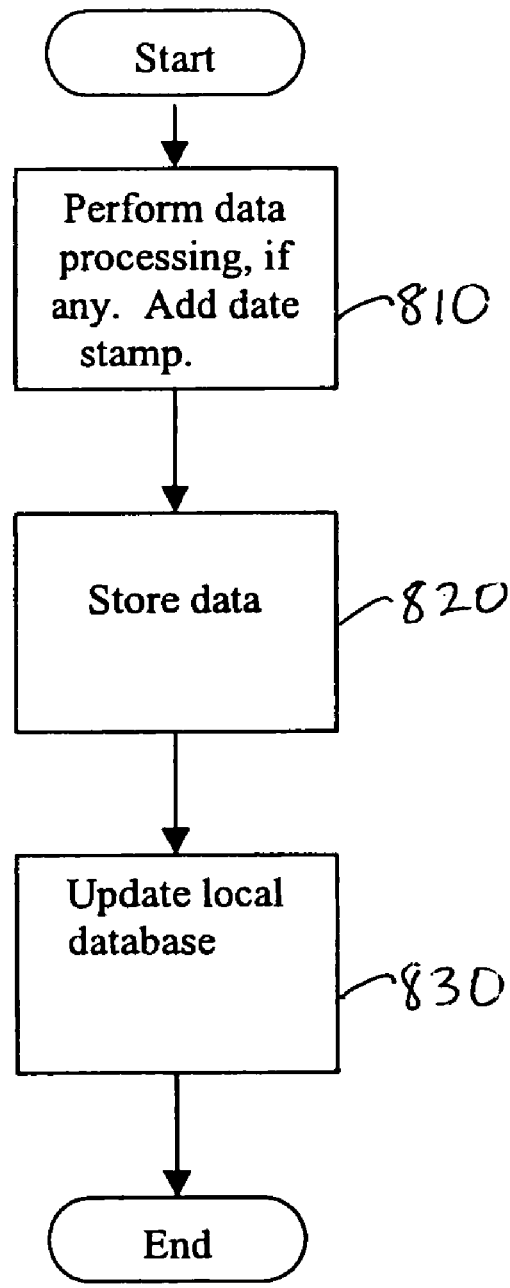
FIG. 11 is a process flow diagram of storing an event at the satellite.

A process flow diagram for storing an event at the satellite is shown in FIG. 11. Data processing, if any, is done on the event 810. In an alternative embodiment, such data processing can include searching the events currently stored for a matching event, e.g. matching a logoff to a logon and storing the events consecutively. In a preferred embodiment, a date stamp is added to the data 810. The data related to the event is stored by any known means, such as a queue 820. In a preferred embodiment the data is stored in a file and the events are stored in chronological order. In an alternative embodiment the satellite database is updated to reflect the event 830.

When communication with the primary data center is re-established, the stored events are sent to the primary data center and the primary data center updates the main database. In a preferred embodiment, the primary data center merely processes each event in a FIFO manner, updating its records to reflect each event. Alternately, error handling can be incorporated into the processing, where incorrect decisions are identified. An incorrect event decision is one that would have a different result if the system had been in connect mode at the time of the event. Error handling is not critical, as it is most important to the integrity of the system merely that the main database is updated to reflect events that have happened, and not necessarily to take follow up action. Note that incorrect decisions also can be made at the primary data center during a disconnect period with a satellite because the primary data center database will not include information from events occurring at the satellite during a disconnect period until the queue has been processed.

For some types of events, the disconnect business logic can be configured so that the request is always denied when the primary data center is unavailable. Events that will result in large negative effects if a wrong decision is made, i.e. such events as access to very expensive premium content, expensive transcontinental phone calls, or changing an account password are examples of events that the implementer of the system can choose to allow only when the satellite is operating in connect mode.

The above steps demonstrate how an event can be processed in either connect mode or disconnect mode. It is to be noted that the system is highly configurable, for instance, a maintenance mode—where the disconnect has been planned—can be included, and various business logics can be included. The various steps, such as replicating data at the satellite, can be accomplished by any known techniques. The flowcharts are exemplary embodiments but steps may be added, deleted, combined, and reordered without departing from the spirit and scope of the invention. For example, the step of performing preprocessing, indicated in FIG. 8 by reference number 510, can be performed either before or after the test for whether the primary is available in some embodiments (indicated by reference number 240 in FIG. 5).

An example is given here where the event is a login request. This is a fairly simple event to process and is given by way of illustration only.

Figure 12:
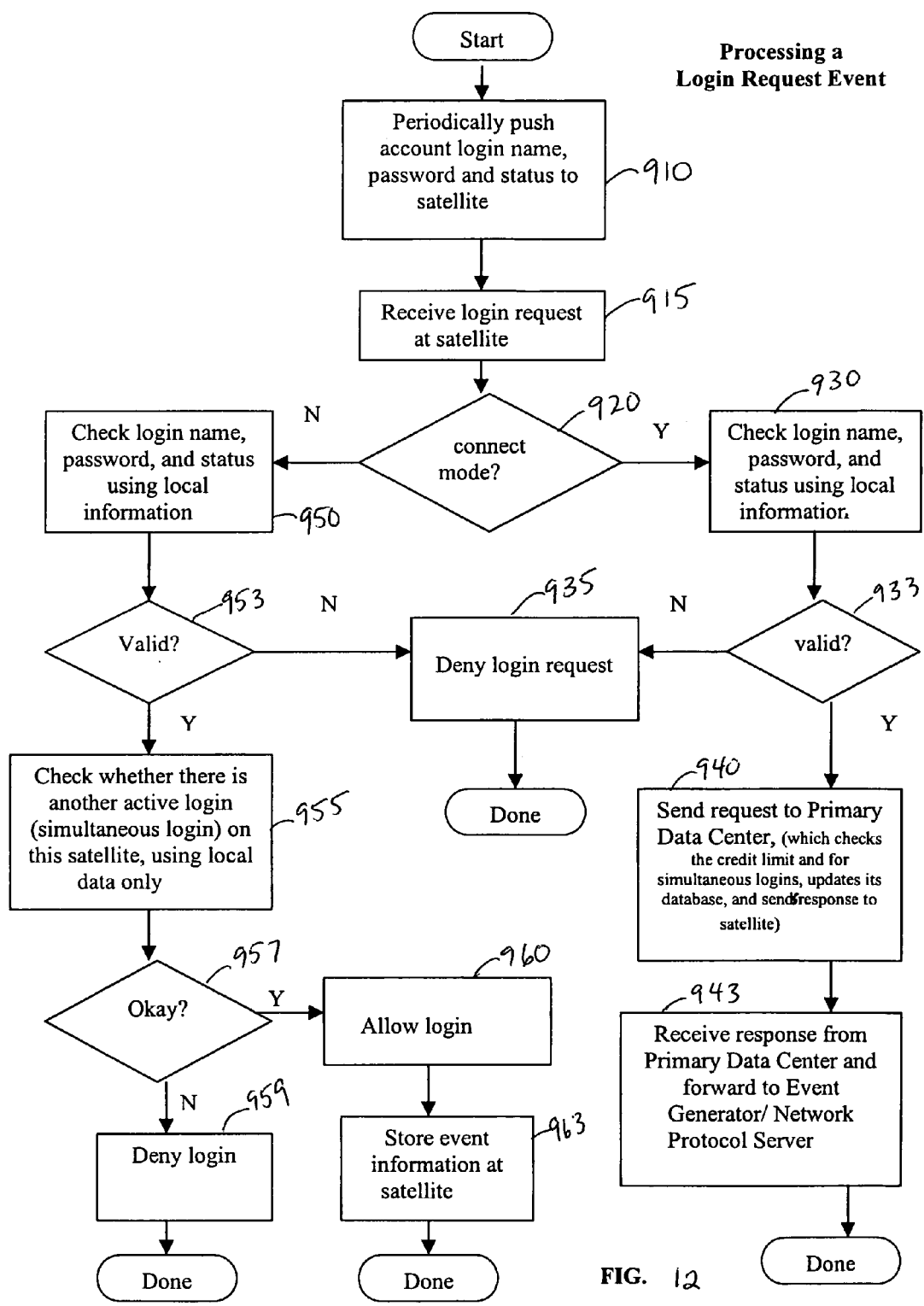
FIG. 12 is a process flow diagram of processing a login request event.

The main database maintains information for each account about the user name (login name), the password, and account status (e.g. open, suspended, closed), credit limit, and whether the account is currently active (i.e. someone is logged in). Referring to FIG. 12, in our example, the account login name, password, and account status are periodically pushed to the satellite 910.

A login request is received at the satellite 915. If the event is to be processed in connect mode 920, preprocessing in the form of verifying the login name, password, and account status is done at the satellite 930 using the satellite database. Alternately, checking this information can be done at the primary data center, or can be done at the satellite after the primary data center has checked the request. If this information is found to be invalid 933, the event is denied 935. In the preferred embodiment, information about denied logins is not forwarded to the primary data center. In an alternative embodiment, information about denied logins can be forwarded to the primary data center.

Note that designing the business logic so that this preprocessing is done at the satellite does not result in accurate decisions 100% of the time even when in connect mode due to the fact that the preprocessing used satellite data that is not guaranteed to be completely up-to-date. It can occasionally happen that the information at the satellite is stale; for instance, an account status has closed since the last time the data was pushed to the satellite.

If the preprocessing indicates the login, password and status are valid 933, the login request is sent to the primary data center, which performs further checks. In our example, the primary data center checks that the remaining credit on the account is acceptable (e.g. more than $10 left), and that there is no simultaneous login present in the primary data center database 940. The primary data center updates its database 940. The satellite receives a response from the primary data center, which in a preferred embodiment is a response to the request directed to the event generator/ network protocol server (i.e. in radius in our preferred embodiment), and the satellite merely forwards this response to the event generator/network protocol server without processing it 943. Alternately the primary data center can respond with information for the satellite and the satellite can perform post-processing of the event prior to sending a response to the event generator/network protocol server.

Going back to the step marked with reference number 920, when the event should be processed in disconnect mode, the satellite uses disconnect business logic to process the event. The satellite checks the login name, password, and status using local data 950. If this information is invalid 953, the login request is denied 935. In a preferred embodiment, information about rejected logins is not stored at the satellite for later communication to the primary data center. Alternately, such information can be stored at the satellite for later communication to the primary data center.

If the information is valid, in a preferred embodiment further tests are not performed and the login is allowed (not shown). In the alternate embodiment shown in FIG. 12, the process proceeds along a YES path 953 to a step where the satellite checks whether there is a simultaneous login at the satellite using local data 955. The local data can include the stored events queue or can include just the satellite database if the satellite data has been continuously updated during the disconnect period, which would be done in an alternate embodiment. A simultaneous login may occur where a family or friend has obtained the account information and is logged in. Because family and friends are often located in the same geographic area as the account holder, it is useful to check the satellite for simultaneous logins. If there is no simultaneous login found using local data 957, the login is allowed 960, and information about the event is stored at the satellite for later communication to the primary data center 963. If there a simultaneous login is found (and if only one login is allowed on the account), the login is denied 957, 959.

As described previously, the system includes at least one event generator/network protocol server 120, which communicates with at least one client 110 and at least one satellite 150. The system includes at least one primary data center 170 in communication with each satellite.

Figure 13:
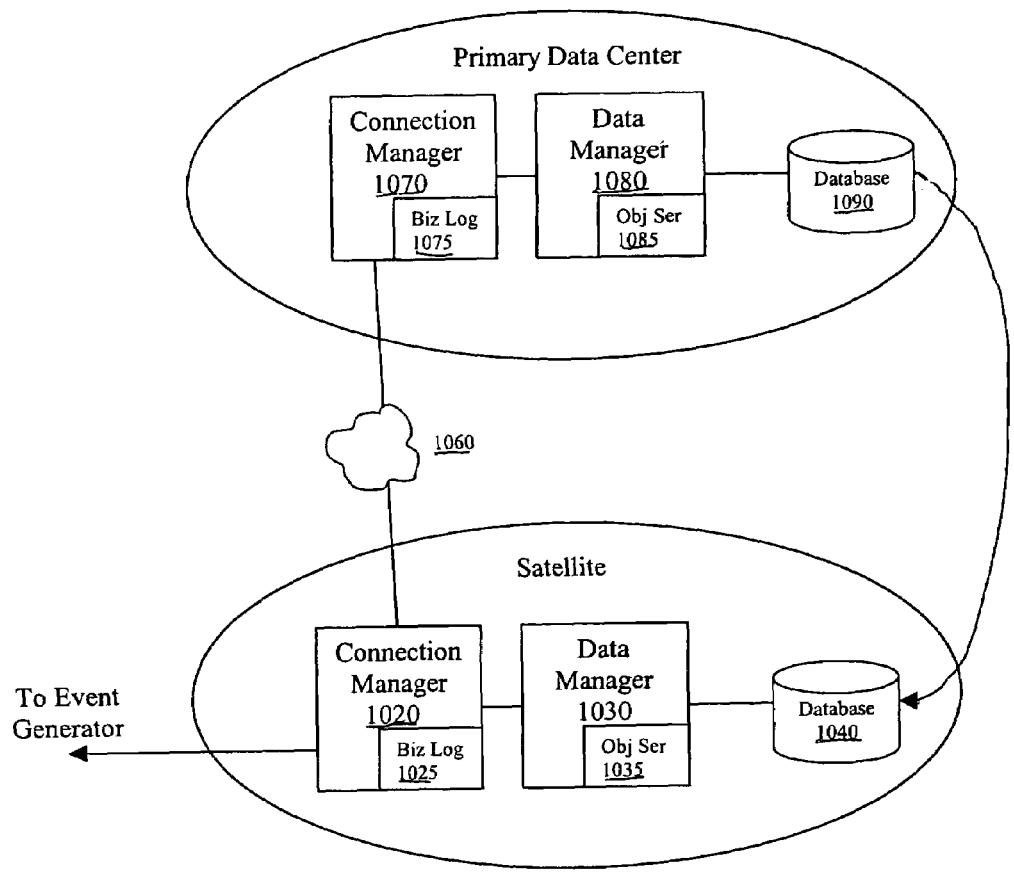
FIG. 13 is a diagram of the system shown in FIG. 4 including further details.

A detailed drawing of a satellite and primary data center is shown in FIG. 13. The satellite includes a satellite connection manager 1020, which is coupled to the event generator/network protocol server 120. The satellite connection manager includes satellite business logic 1025. The satellite business logic includes business logic for connect mode as well as for disconnect mode ("disconnect business logic") (not shown). In an alternate embodiment it includes further business logic, e.g. for operation in maintenance mode.

The satellite connection manager is coupled to a satellite data manager 1030, which includes an object server 1035 in a preferred embodiment. In a preferred embodiment data objects are used to handle data. The data manager 1030 is coupled to a satellite database 1040. This satellite database is stored locally and does not include all the data in the entire system, and can include stale information. The coupling of the satellite connection manager and the satellite data manager as well as the coupling of the satellite data manager and the satellite database is preferably by direct connection.

The satellite connection manager 1020 is coupled to a primary connection manager 1070 at the primary data center 170. The primary data center typically is in a remote location from the satellite. Usually the coupling is through a network connection such as the Internet. The primary connection manager 1070 includes business logic 1075. The primary connection manager 1070 is coupled to a primary data manager 1080 which includes an object server 1085. The primary data manager 1080 is coupled to a main database 1090. The coupling of the primary connection manager and the primary data manager as well as the coupling of the primary data manager and the main database is preferably by direct connection.

The main database 1090 and the satellite database 1040 are coupled to enable transfer of data to occur. This coupling is indicated by the communication link drawn as arrow 1099. The coupling can be implemented by database replication, as known in the art.

The above system comprises a fault tolerant real-time system. When the primary data center is available, the system operates as a normal real-time system. When the primary data center is unavailable to a satellite, user requests to the satellite are processed in an alternate mode that includes use of near-real-time data in decision-making. The concept of integrating fault tolerance into an real-time system is innovative and can be applied to any real-time system.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

We claim:

1. A method for processing an event in a system comprising a satellite and a primary data center, comprising:

receiving an event at the satellite, the event corresponding to a service request from a user, the event including an indication of an account of the user;

the satellite determining whether the primary data center is available for processing the event, wherein the satellite determining whether the primary data center is available for processing the event includes the satellite sending a query to the primary data center and the satellite determining whether the primary data center responds to the query within a configurable interval, and wherein when the satellite determines that the primary data center responds to the query within the configurable interval, the primary data center is available;

if the primary data center is available, processing the event in connect mode by:

transmitting the event to the primary data center; and executing first business logic at the primary data center, wherein the first business logic includes logic and data for processing events when the satellite is in connect mode, and if the primary data center is unavailable, processing the event in disconnect mode by:

executing second business logic at the satellite, wherein the second business logic includes logic and data different from the first business logic for processing events when the satellite is in disconnect mode, and storing information associated with the event at the satellite for later communication to the primary data center.

2. A method as in claim 1, wherein processing the event in disconnect mode further includes accessing data from the primary data center that is stored on the satellite.

3. A method as in claim 1, wherein processing the event in connect mode includes updating a summary field for an account associated with the event.

4. A method as in claim 1, further comprising sending said information to the primary data center when the primary data center becomes available.

5. A method as in claim 4, further comprising processing the information at the primary data center at a time of reception at the primary data center.

6. A method as in claim 4 further comprising checking the information for a special event.

7. A method as in claim 6, wherein the special event is a simultaneous login, and further comprising:
monitoring the information and a second set of information associated with a plurality of incoming events coming from the satellite for an associated logoff associated with the simultaneous login;
determining a rate associated with a connect time associated with the simultaneous login and the logoff; and
updating an accounting record in accordance with the rate and the connect time at the time the rate is determined.

8. A method as in claim 1, further comprising preprocessing the event at the satellite.

9. A method as in claim 8, wherein the preprocessing is done before the step of determining whether the primary data center is available.

10. A method as in claim 8, wherein the preprocessing is done after the step of determining whether the primary data center is available.

11. A method as in claim 8, wherein the preprocessing includes steps of: verifying a login name associated with an account associated with the event; verifying a password associated with the account;
verifying an account status associated with the account; denying service if a result of any of the steps of verifying is negative.

12. A method as in claim 1, wherein processing the event in connect mode includes checking a current property of the account.

13. A method as in claim 12, wherein the current property is an account balance.

14. A method as in claim 12, wherein the current property is whether a login associated with the account is currently in use.

15. A method as in claim 1, wherein processing the event in connect mode includes sending a response to a source of the event.

16. A method as in claim 1, wherein processing the event in disconnect mode further includes sending a response to a source of the event.

17. A method as in claim 1, wherein processing the event in connect mode includes rating the event.

18. A method as in claim 17, wherein the event is a phone call.

19. A method as in claim 1, wherein processing the event in disconnect mode further includes rating the event.

20. A method as in claim 19, wherein the event is a phone call.

21. A computer program product stored on a computer readable storage medium for processing an event in a system comprising a satellite and a primary data center, comprising:
computer code that receives an event at the satellite, the event corresponding to a service request from a user, the event including an indication of an account of the user;
computer code that determines whether the primary data center is available for processing the event, wherein the computer code that determines whether the primary data center is available for processing the event includes computer code that sends a query to the primary data center, computer code that determines whether the primary data center responds to the query within a configurable interval, and computer code that determines that the primary data center is available when the primary data center responds to the query within the configurable interval;
computer code that, if the primary data center is available, processes the event in connect mode, wherein the computer code that processes the event in connect mode includes computer code that transmits the event to the primary data center; the primary data center being configured to execute first business logic that includes logic and data for processing events when the satellite is in connect mode; and
computer code that, if the primary data center is not available, processes the event in disconnect mode, wherein the computer code that processes the event in disconnect mode includes:
computer code that executes second business logic at the satellite, wherein the second business logic includes logic and data different from the first business logic for processing events when the satellite is in disconnect mode; and
computer code that stores information associated with the event for later communication to the primary data center.

22. The computer program product of claim 21, wherein the computer readable medium is a CD-ROM, floppy disk, tape, flash memory, system memory, or hard drive.

23. The computer program product of claim 21, wherein the computer code that processes the event in disconnect mode further includes computer code that accesses data from the primary data center that is stored on the satellite.

24. The computer program product of claim 21, wherein the computer code that processes the event in connect mode includes computer code that updates a summary field for an account associated with the event.

25. The computer program product of claim 21, further comprising computer code that sends said information to the primary data center when the primary data center becomes available.

26. The computer program product of claim 25, further comprising computer code that processes the information at the primary data center at a time of reception at the primary data center.

27. The computer program product of claim 25 further comprising computer code that checks the information for a special event.

28. The computer program product of claim 27, wherein the special event is a simultaneous login, and further comprising:
computer code that monitors the information and a second set of information associated with a plurality of incoming events coming from the satellite for an associated logoff associated with the simultaneous login;
computer code that determines a rate associated with a connect time associated with the simultaneous login and the logoff; and computer code that updates an accounting record in accordance with the rate and the connect time at the time the rate is determined.

29. The computer program product of claim 21, further comprising computer code that preprocesses the event at the satellite.

30. The computer program product of claim 29, wherein the preprocessing is done before the step of determining whether the primary data center is available.

31. The computer program product of claim 29, wherein the preprocessing is done after the step of determining whether the primary data center is available.

32. The computer program product of claim 29, wherein the preprocessing includes:
   computer code that verifies a login name associated with an account associated with the event;
   computer code that verifies a password associated with the account;
   computer code that verifies an account status associated with the account;
   computer code that denies service if a result of any of the steps of verifying is negative.

33. The computer program product of claim 21, wherein processing the event in connect mode includes checking a current property of the account.

34. The computer program product of claim 33, wherein the current property is an account balance.

35. The computer program product of claim 33, wherein the current property is whether a login associated with the account is currently in use.

36. The computer program product of claim 21, wherein the computer code that processes the event in connect mode includes computer code that sends a response to a source of the event.

37. The computer program product of claim 21, wherein the computer code that processes the event in disconnect mode further includes computer code that sends a response to a source of the event.

38. The computer program product of claim 21, wherein the computer code that processes the event in connect mode includes computer code that rates the event.

39. The computer program product of claim 38, wherein the event is a phone call.

40. The computer program product of claim 21, wherein the computer code that processes the event in disconnect mode further includes computer code that rates the event.

41. The computer program product of claim 40, wherein the event is a phone call.

42. A method for processing an event in a system, the system including a satellite and a primary data center, the method comprising:
   receiving an event at the satellite, the event corresponding to a service request from a user, the event including an indication of an account of the user;
   the satellite determining whether the primary data center is available for processing the event, wherein the satellite determining whether the primary data center is available for processing the event includes the satellite sending a query to the primary data center and the satellite determining whether the primary data center responds to the query;
   if the primary data center is available, pre-processing the event using first information stored on the satellite, sending the event to the primary data center, and processing the event at the primary data center when the event is received at the primary data center, wherein processing the event at the primary data center includes executing first business logic at the primary data center, wherein the first business logic includes logic and data for processing events when the satellite is in connect mode, and wherein the first information stored on the satellite is a subset of second information stored at the primary data center; and
   if the primary data center is unavailable, determining whether to process the event at the satellite and processing the event at the satellite when it is determined that the event is to be processed at the satellite, wherein processing the event at the satellite includes:
   executing second business logic at the satellite, wherein the second business logic includes logic and data different from the first business logic for processing events when the satellite is in disconnect mode; and
   storing third information associated with the event for later communication to the primary data center.

* * * * *